United States Patent [19]

Ibanez et al.

[11] Patent Number: 4,791,243
[45] Date of Patent: Dec. 13, 1988

[54] COMPACT DEVICE FOR LONG STROKE ENERGY ABSORPTION

[75] Inventors: Paul Ibanez, Woodland Hills; Kelvin L. Merz, Los Angeles, both of Calif.

[73] Assignee: Anco Engineers, Inc., Culver City, Calif.

[21] Appl. No.: 10,709

[22] Filed: Feb. 4, 1987

[51] Int. Cl.[4] .......................... H02G 7/18; H02G 7/04; F16F 7/12
[52] U.S. Cl. .................................. 174/45 R; 188/371; 248/58; 248/548
[58] Field of Search .................. 174/40 R, 40 TD, 42, 174/45 R, 45 TD; 188/371; 248/58, 60, 63, 64, 548, 636, 900

[56] References Cited

U.S. PATENT DOCUMENTS

| | | | |
|---|---|---|---|
| 3,005,866 | 10/1961 | Fraser et al. | 248/64 X |
| 3,586,131 | 6/1971 | Le Mire | 188/371 |
| 3,705,740 | 12/1972 | Shiomi et al. | 188/371 X |
| 4,258,934 | 3/1981 | Tsuge et al. | 188/371 X |

FOREIGN PATENT DOCUMENTS

| | | | |
|---|---|---|---|
| 446118 | 7/1927 | Fed. Rep. of Germany | 174/45 R |
| 925379 | 3/1947 | France | 174/45 R |
| 1419268 | 12/1975 | United Kingdom | 188/371 |

Primary Examiner—Laramie E. Askin
Attorney, Agent, or Firm—Thomas I. Rozsa

[57] ABSTRACT

A compact device for absorbing kinetic energy generated by, for example, broken electric power lines on electric power transmission towers. The device consists of a non-spring helix, or in or out of plane flat coils that are placed between an electric transmission tower and the conductor insulator. The device deforms by plastically uncoiling in response to forces greater than a predetermined force. The device is a single-event device, designed to be replaced after one extraordinary dynamic event. The device can also be used in other structures or machinery requiring compact long stroke energy absorption.

7 Claims, 2 Drawing Sheets

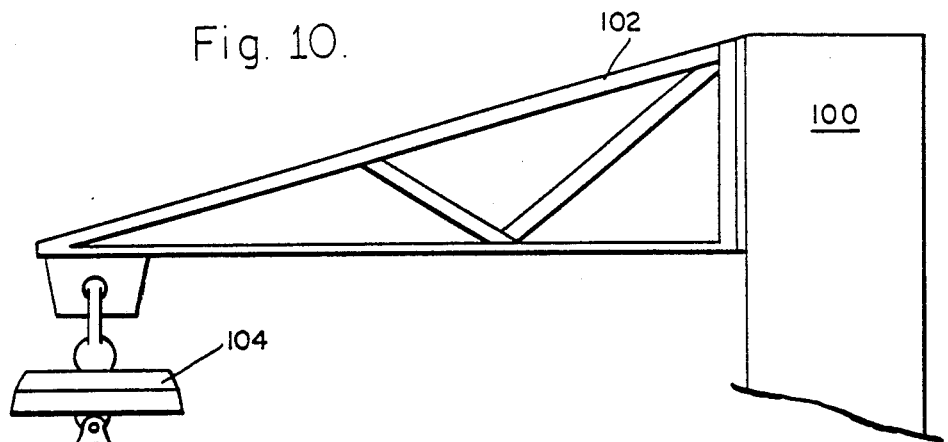
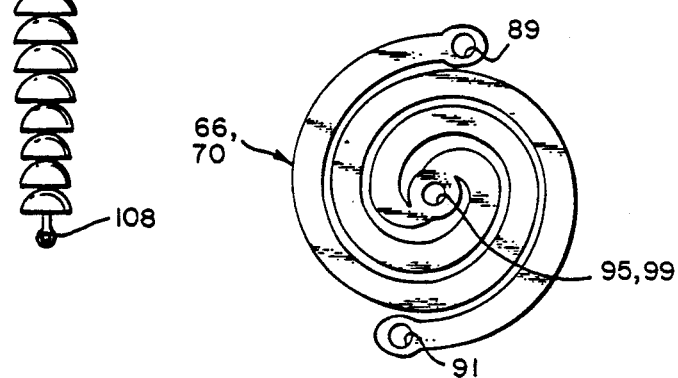
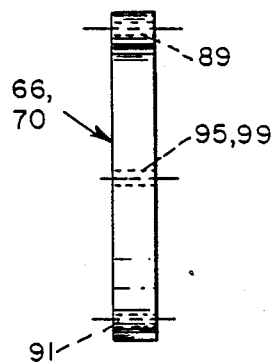
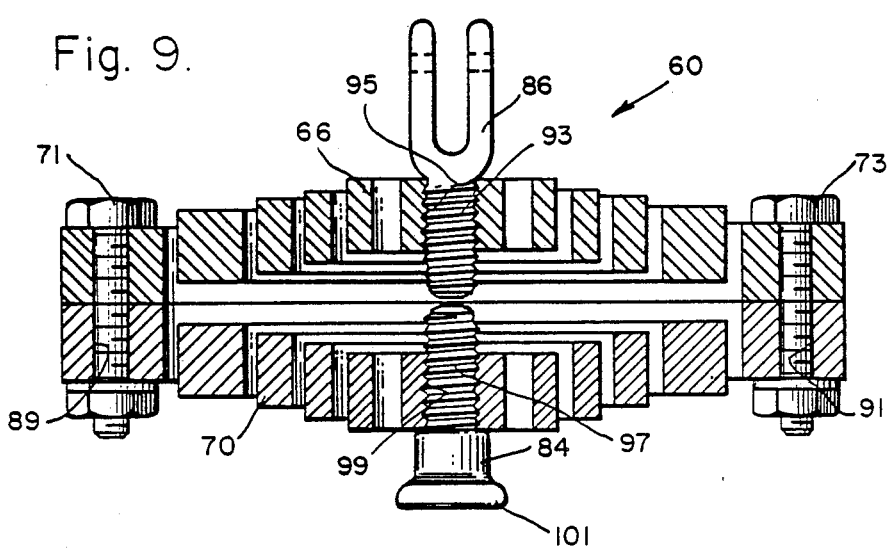

COMPACT DEVICE FOR LONG STROKE ENERGY ABSORPTION

BACKGROUND OF THE INVENTION

1. Field of the Invention

The field of the present invention relates to devices which are used to absorb energy in a structure or a machine by yielding over a long stroke.

As one of many examples consider forces imparted to transmission towers which carry power lines. Transmission towers are presently designed to withstand numerous types of loads which are imparted to them. A standard load is the dead load resulting from the weight of the transmission lines and the tower components. Other dead loads such as ice formation on the transmission tower and the lines may be encountered in some areas.

In addition to these standard loads, however, the transmission tower and its components are also subjected to random loads which are both transient and dynamic in nature. Wind is a serious problem, especially when accompanied by storms such as hurricanes and tornados. Wind imparts heavy vibration loads and other dynamic forces to the transmission tower. Random formation and shedding of ice on the conductor creates an unbalanced and dynamic ice load. Wind can combine with ice to increase the effect of each on loading of the transmission tower. Vandalism, aircraft impact, conductor breaks, stringing error, etc. also impart a significant dynamic load to the structure.

In addition to the problems mentioned above, internal structural failure of a tower or line will place a heavy load on adjacent transmission towers that are not broken and, therefore, are forced to carry the increased load. When a conductor, tower, or insulator is damaged at a certain location, this impacts all neighboring transmission towers which are suddenly forced to carry a greater load. In conjunction with a broken conductor, other components of the tower such as insulators, arms, guys and the tower itself may break. Such failures create a serious load problem on the remaining transmission towers.

2. Description of the Prior Art

Numerous devices have been used to reduce dynamic shock loads to structures by absorbing energy by plastic material deformation. Such devices often utilize either a rolling ring or torus which absorbs energy by cyclic plastic deformation when the supporting mandril is stroked. Other devices utilize simple bars which are directly pulled, twisted, or bent to achieve energy absorption by plastic material deformation. All of these devices require excessive length or kinematic linkages to achieve long-stroke energy absorption. No prior metallic devices have been compact enough to allow extension of ten to twenty times the initial length.

None of the prior art devices could be used to alleviate the serious problem of conductor break and attendant transmission tower failure which arises when one of the conductors or an adjoining part of the transmission tower breaks. The increased load on all neighboring towers cannot be easily withstood and the primary tower and the adjoining towers fail due to this increased load. A particularly dramatic occurrence is known as a "zipper effect" or "cascade failure." When the first conductor or tower fails, it places an undue load on the adjoining tower and it also fails and may even topple. This places an undue load on the next transmission tower which may also fail. This in turn places an undue load on the next tower and so on. The result is a multiple tower failure occurring in rapid succession. Instances have occurred where several miles of transmission towers have failed all due to the original failure of one conductor or tower.

One concept in prior art tower designs is to design energy dissipating elements into the tower components. Another prior art design is to reduce the incidence of cascading tower failures by including a stronger tower at short intervals in the line. The stronger tower is designed to remain intact under unbalanced longitudinal loads.

It has also been proposed to isolate supporting structures from extreme longitudinal loads by including load limiting attachment devices, that is, for example, "breakaway or swing" arms. While this approach will prevent failure of the supporting structures, it will not necessarily prevent extensive damage to the conductors and hardware. The load limiting devices have almost no energy dissipating capability, and there is a potential loss of great lengths of conductors.

Some prior art devices which utilize friction as an energy dissipation means have been incorporated into some conductor suspensions to alleviate the conductor break problem. However, such devices which utilize a slipping conductor shoe or clutch mechanism do not always slip or operate at the desired load level, due to variance in friction coefficient.

Therefore, although devices and tower designs have been produced in order to minimize transmission tower failure, once such a conductor break or failure occurs, the presently known tower designs and devices are unable to effectively handle the increased stress resulting therefrom. There is no known prior device which is compact enough to be simply incorporated in the conductor suspension and which is able to absorb these increased loads by long-stroke plastic material deformation to prevent the occurrence of multiple tower failures resulting from the initial failure of one conductor or one transmission tower.

SUMMARY OF THE PRESENT INVENTION

The present invention relates to an apparatus which absorbs increased loads placed on structures such as transmission towers and related components that result from dynamic events (such as a break in a transmission line conductor). It is also useful for any application requiring long stroke energy absorption, including applications in machinery, especially if a compact initial configuration is needed.

The present invention further relates to a device to be attached between the transmission tower and the conductor-insulating support strings which would allow linear response until just below a point where plastic damage of the tower was imminent. At that point a nonlinear element, which can be considered to be a fuse, will allow a conductor support string to yield significantly, so as to reduce loads and transmit them to neighboring towers and their support strings. This sharing would be partial since the nonlinear element or fuse would maintain some of its strength and continue to bear some of the load. As a result, instead of the entire load being borne by a single tower which would therefore fail, the excess load is distributed to a few adjacent towers so that the load is borne by a multiplicity of adjacent towers. The nonlinear element or fuse serves the dual function of yielding to alleviate the load and absorbing energy to further reduce peak tower and conductor loads. As a result of the present invention being incorporated into the transmission tower structure between the tower and the conductor-insulating support strings, progressive failure of both the tower and the conductor will be prevented. In addition, the cost of manufacturing and erecting the transmission towers would be reduced since the towers will be required to handle smaller loads.

Transmission line design is often governed by the need to resist the high longitudinal loads imposed by a line break. This event requires towers stronger (and more costly) than needed for normal service. Further, failure to resist a line break can lead to extremely costly "zipper" type multi-tower failures. The present invention is a nonlinear breakaway device to be attached between tower and conductor so as to allow give and load redistribution, without tower failure in the event of a line break. The result is minor damage to a few of the towers and primary damage to the nonlinear apparatus or fuse. The cost of replacing the nonlinear apparatus fuse is very minor compared to the cost of repairing transmission towers and conductor lines.

It has been discovered, according to the present invention, that if a nonlinear energy absorbing apparatus is inserted between a transmission tower and the conductor line which it supports, then in the event of a conductor line break, or other dynamic event, the nonlinear apparatus will serve to yield and therefore reduce the impact of the additional load placed on the tower and further serve to absorb some of the shock load to the tower. If such nonlinear apparatuses are installed on each conductor of each transmission tower, then the impact of the sudden load caused by a line break or other dynamic event will be shared among adjoining towers such that each tower will only have to bear a small portion of the excess load. As a result, although the nonlinear apparatus will be damaged and will need to be replaced, the tower structures and other conducting lines will be saved from damage.

It has also been discovered, according to the present invention, that if the nonlinear apparatus includes provision for a preload such that it is activated only when high excess loads occur, then the nonlinear apparatus will only be activated during these emergency situations and will not be activated during stringing or other maintenance operations which cause the insulator string to be loaded beyond the normal deadweight suspension load.

It has also been discovered, according to the present invention, that the nonlinear device may include a preload whereby it activates only when the imparted load exceeds a given value and not during normal operating and stringing loads.

It is therefore an object of the present invention to provide an apparatus which will absorb the high energy loads imparted to transmission towers or other structures during a severe dynamic event. It will further serve to distribute the load impact among several adjacent towers in order to prevent any one tower from failing due to overload.

It is another object of the present invention to provide a preload such that the device will not extend during stringing loads, and not extend unless normal operating loads are exceeded.

By incorporating the present invention into transmission towers, it will allow new line construction to use less costly towers. It will also allow upgrade of existing lines to allow heavier conductors or will increase their resistance to dynamic failures. It is therefore a further object of the present invention to benefit electric utilities by providing an apparatus which will permit the utilization of less costly transmission lines, lower cost electricity distribution, and more reliable electric service, particularly under bad weather conditions when it is most needed.

Further novel features and other objects of the present invention will become apparent from the following detailed description, discussion and the appended claims, taken in conjunction with the drawings.

DRAWING SUMMARY

Referring particularly to the drawings for the purpose of illustration only and not limitation, there is illustrated:

FIG. 6 is a plan view of an energy absorbing double coil according to the present invention;

FIG. 7 is a side view of the energy absorbing double coil illustrated in FIG. 6.

FIG. 9 is a cross-section of the device of FIG. 8 showing how the central eyebolts are used to obtain a preload by deforming the coils slightly out-of-plane.

FIG. 10 is a side elevation showing an energy absorber according to the present invention installed on an electrical transmission tower.

DETAILED DESCRIPTION OF THE PREFERRED EMBODIMENT

Although specific embodiments of the invention will now be described with reference to the drawings, it should be understood that such embodiments are by way of example only and illustrate only a small number of the many possible specific embodiments which can represent applications of the principles of the invention. Various changes and modifications apparent to one skilled in the art to which the invention pertains are deemed to be within the spirit, scope and contemplation of the invention as further defined in the appended claims. To provide an example, its use with electrical transmission towers will be discussed.

The present invention can be a device to be attached between the transmission tower and the conductor-insulating support strings which would allow linear response until just below a point where plastic damage of the tower was imminent. At that point a nonlinear element, which can be considered to be a fuse, will allow the conductor support to yield significantly so as to reduce loads and transmit them to neighboring towers and their conductor supports. This sharing would be partial since the nonlinear element or fuse would maintain some of its strength and share in bearing the load. As a result, instead of the entire load being borne by a single tower which would therefore fail, the excess load is distributed to a few adjacent towers and this sharing effect distributes the load so that it could be appropriately borne by a multiplicity of adjacent towers. The nonlinear element or fuse serves the dual function of yielding to alleviate the load and absorbing energy to further reduce peak loads on towers and conductors in addition to distributing the load to adjacent towers. As a result of the present invention being incorporated into the transmission tower structure between the tower and the conductor-insulating support strings, progressive failure of both the tower and the conductor will be prevented. In addition, the cost of manufacturing and erecting the transmission towers would be reduced since peak conductor load would not be imposed on the structure.

In order not to have the present invention activated during normal operations which place a greater than normal load on the tower (such as stringing the line or normal maintenance operations), the present invention incorporates two design features which allow activation of the device only during an unusual event. During stringing of conductors, the fuse is bolted together solidly, transferring the load directly and thereby preventing activation of the fuse. In addition, during normal operation, the bolts are removed, and because the fuse is preloaded, it is relatively stiff until the desired load is reached. Then, the fuse yields plastically as the load increases.

An energy absorber according to the present invention may be designed in a variety of shapes and sizes, of which the following specific embodiments are merely illustrative.

Figure 1:
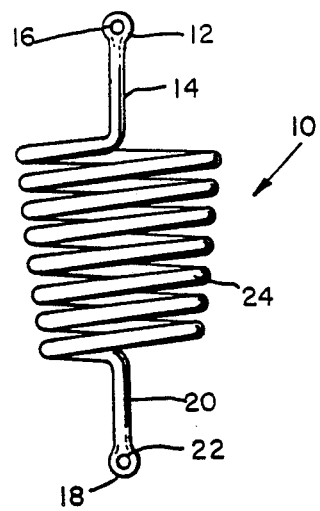
FIG. 1 is a side elevational view of a helix design energy absorbing device according to the present invention.

The energy absorber may take the form of helical coil 10 as illustrated in FIG. 1, having upper end 12 consisting of an elongated vertical portion 14 terminating in circular eye 16 and lower end 18 having vertical portion 20 terminating in circular eye 22, with a substantially helical coil 24 intermediate upper end 12 and lower end 18. There are seven turns in helical coil 24 in the embodiment illustrated in FIG. 1. Naturally, the exact number of turns and termination is a matter of choice and may be selected to meet the anticipated energy absorption and connection needs of a particular installation.

The energy absorber can be fabricated from any suitable material. A particularly suitable material is steel. Helical coil 24 is wound to have a preset compression, that is, the turns of the coil are under a preset stress when the device is at rest. In use, upper end 12 is attached to a transmission line tower through circular eye 16 and lower end 18 is attached to the top of an insulator through circular eye 22. The lower end of the insulator is attached to the conductor (see FIG. 10). When the conductor is subjected to a dynamic stress in excess of the preset compression of energy absorber 10, energy absorber 10 stretches plastically, extending to several times its original length and thereby absorbing energy.

The energy absorber is not a spring, but is intended merely to deform plastically under stress. Stretching or deforming an energy absorber according to the present invention dissipates considerable energy. The precise amount of energy dissipated depends on specific details of design and can be determined for any particular embodiment of the energy absorber by those skilled in the art.

Figure 2:
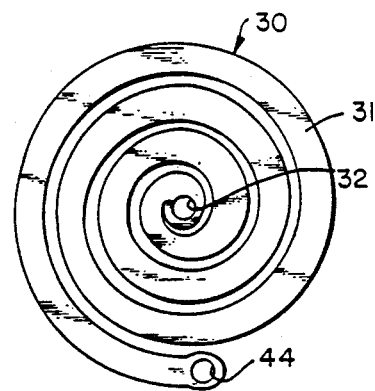
FIG. 2 is a plan view of an energy absorbing single coil according to the present invention.
Figure 3:
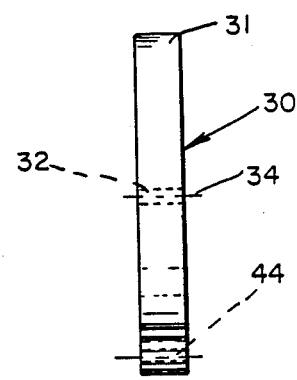
FIG. 3 is a side view of the energy absorbing single coil illustrated in FIG. 2.
Figure 4:
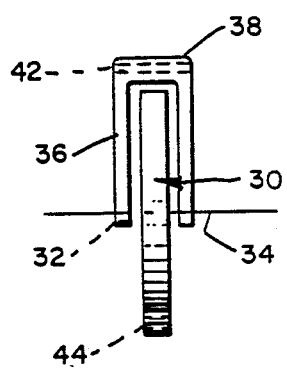
FIG. 4 is a side elevation of the coil illustrated in FIG. 2, with added support bracket and central axle, which allows in-plane uncoiling producing a long stroke energy absorber.

Another embodiment of the present invention is the single in-plane coil 30 illustrated in FIGS. 2, 3 and 4, consisting of a flat coil 31, typically steel, having a central axis 32, through which bolt and nut or axle 34 secure mounting bracket 36 to coil 31, which terminates in upper mounting plate 38, having circular eye 42 for attaching in plane coil 30 to a transmission tower. The outer end of coil 31 includes circular eye 44 for attaching in-plane coil 30 to the top of an insulator. Naturally the exact number of coil turns and termination configuration is a matter of choice and may be selected to meet the anticipated energy absorption and connection requirements of a particular application.

The embodiment illustrated in FIGS. 2, 3 and 4 can be readily constructed from flat plate material, preferably steel. An economical and convenient method of manufacture employs a numerically controlled or optical follower cutting torch to cut the pattern. The force deflection curve of in-plane coil 30 can be controlled by controlling the parameters of the coil during manufacture. Characteristics of in-plane coil 30 that determine the force required to deform in-plane coil 30 include the width and thickness of the material, and the ductility of the material itself. It is not necessary that the coil be of uniform width throughout its length. The force required to deform the energy absorber can be adjusted by varying the width of the spirals as a function of the radius.

Figure 5:
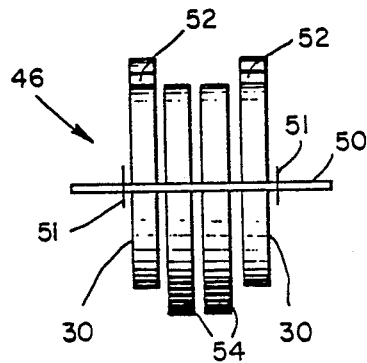
FIG. 5 is a side elevation of four of the coils illustrated in FIG. 2, with a central axle which allows in-plane uncoiling producing a long stroke energy absorber.

Naturally, some transmission lines may be subjected to greater unusual stress than others and will require energy absorbers that can safely dissipate greater amounts of energy than other transmission lines will require. To accommodate different custom needs without manufacturing an excessive number of models, it is convenient to mount more than one energy absorber within a single housing for use with a single insulator and tower assembly, as illustrated in FIG. 5 which shows, for example, a quadruple in-plane coil.

Quadruple in-plane coil 46 consists of four in-plane coils 30 (such as that illustrated in FIG. 2) mounted on axle 50 through the center of the four in-plane coils. Washers 51 are fixed to axle 50 by welding or other conventional means to prevent in-plane coils 30 from slipping off axle 50. Upper eyes 52 are attached to the transmission tower arm, and lower eyes 54 are attached to the top of an insulator. Thus axle 50 is not attached to any mounting plate.

In operation, each of the four in-plane coils 30 rotates about axle 50 as it unwinds; the two coils suspended from upper eyes 52 rotating in the same circular direction as but unwinding in the opposite direction from those from which the insulator is suspended (that is, those having lower eyes 54). This arrangement permits absorption of approximately four times as much energy as the embodiment illustrated in FIGS. 2, 3 and 4, without required increased manufacturing diversity.

Referring to FIGS. 6 through 9, there is shown a pair of double out-of-plane energy absorbing coils, designated as out-of-plane coil 60, so called because under stress, it deforms by unwinding perpendicular to its plane of construction, resulting in a design that does not occupy much vertical space relative to the amount of energy it will absorb. The out-of-plane coil 60 hangs as illustrated in FIG. 6 and relative to, for example, the coil of FIG. 1 or 4, occupies much less vertical space.

Figure 8:
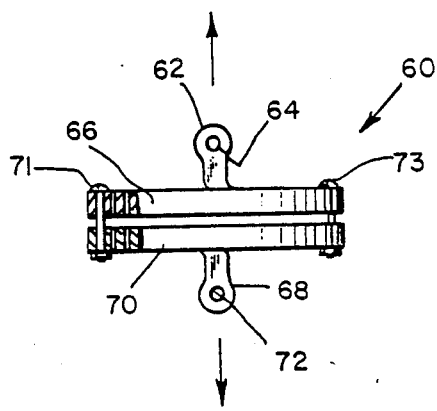
FIG. 8 is a side elevation of two of the coils shown in FIG. 6 with added eye-bolts and assembly bolts which allow out-of-plane uncoiling producing a long stroke energy absorber.

Out-of-plane coil 60 consists of a pair of the double coils of the type illustrated in FIG. 6 having eyes 64 and 72 attached to the central portion of each respective coil 66 and 70, and being fastened together at two points along their circumferences, said points lying on a diameter of the two superposed coils 66 and 70 by bolts and nuts 71 and 73 (See FIG. 8). Coils 66 and 70 may be disposed so that when viewed in their superposed relationship they appear to be wound in opposite directions although this is not necessary to the successful operation of the invention. In fact a single double coil can also be effective.

FIG. 9 further illustrates this out-of-plane embodiment of a long stroke energy absorber according to the present invention. Prestressed double coil 60 includes upper double coil 66 and lower double coil 70, which are fastened together by two bolts and nuts 71 and 73 located through respective holes 89 and 91, formed through upper double coil 66 and lower double coil 70 at points near their outer circumference, perpendicular to the general circular plane of each respective double coil, and located along a diameter of each respective double coil. Clevis 86, includes threaded male portion 93, which is screwed into a corresponding threaded female portion 95 of upper double coil 66. Fastener 84 includes threaded male portion 97, which is screwed into threaded female portion 99 of lower double coil 70, and a socket 101, for mounting with a ball for mating with a standard insulator socket (not shown). Naturally, clevis 86 and fastener 84 may be replaced with any type of threaded fastener that permits prestressed double coil 60 to be suspended from a tower arm and allows an insulator to be suspended from its lower portion.

During assembly, upper double coil 66 and lower double coil 70, both of which are flat, that is, each double coil is formed in a single plane, are fastened together by nuts and bolts 71 and 73. Then clevis 86 and fastener 84 are screwed into the respective apertures in the center of upper coil 66 and lower coil 70 and are screwed inwardly until they meet and push upper coil 66 and lower coil 70 into the inwardly concave configuration shown in FIG. 9, which puts a predetermined stress preload on each of upper coil 66 and lower coil 70.

In operation, a transient shock or force deforms the coils out of the plane of their construction, that is, prestressed double coil 66 is deformed by clevis 86 being pulled upwardly and prestressed double coil 70 is deformed by ball socket 101 being pulled downwardly. Thus each coil unwinds, forming a double helix, from the center outwardly toward nuts and bolts 71 and 73. The prestressing of the two coils causes the device to be relatively stiff under normal operation. This prestressing permits adjustment of the deforming force that is required to utilize the benefits of the long stroke energy absorber, allowing the embodiment of FIG. 9 to be used in many different applications that require different initial deforming forces.

Naturally the number of turns in the coils, the number of coil arms (double has been shown, but more than two are possible), and termination details is a matter of choice and may be selected to the anticipated energy absorption and connection needs of a particular installation. Further, the number of coils of the type shown in FIG. 6 is not limited to one or two but can be any number in order to achieve unlimited extension length.

Therefore through use of any of the combinations of energy reduction and load absorption coil members, the load created by a dynamic event can be absorbed by the coil and distributed to adjoining coils so that the severe impact is not felt by the transmission tower and serious damage to the tower is eliminated. Furthermore, the device eliminates the serious zipper or domino effect of having a multiplicity of transmission towers collapse in a series. In addition, the present invention substantially reduces the dynamic forces applied to a tower during conductor break.

FIG. 10 illustrates an example of how the present invention can be attached to the tower to achieve its intended purpose. A tower arm 102 extends from the transmission tower 100. Any of the previously described present invention energy absorber 104 is then attached at one end to the tower arm 102 and is attached at its other end to the insulator string 106 which in turn is attached to conductor 108.

The present long stroke energy absorber can also be used in other machinery and structures.

The invention is a compact device for absorbing kinetic energy generated by, for example, broken electric power lines on electric power transmission towers. The device consists of a non-spring helix, or in or out of plane flat coils that are placed between an electric transmission tower and the conductor insulator. The device deforms by plastically uncoiling in response to forces greater than a predetermined force. The device is a single-event device, designed to be replaced after one extraordinary dynamic event. The device can also be used in other structures or machinery requiring compact long stroke energy absorption.

Of course, the present invention is not intended to be restricted to any particular form or arrangement, or any specific embodiment disclosed herein, or any specific use, since the same may be modified in various particulars or relations without departing from the spirit or scope of the claimed invention shown and described here, of which the apparatus shown is intended only for illustration and for disclosure of an operative embodiment and not to show all of the various forms or modifications in which the invention might be embodied or operated.

The invention has been described in considerable detail in order to comply with the patent laws by providing full public disclosure of at least one of its forms. The detailed description, however, is not intended in any way to limit the broad features or principles of the invention, or the scope of patent property to be granted.

We claim:

1. A compact apparatus for long stroke energy absorption, which apparatus is attached to the tower arm of a transmission tower and to the insulator string of a transmission tower, the apparatus comprising:
   a. a first energy absorbing coil aligned in a horizontal plane of orientation and configured so as to plastically deform out of its horizontal plane of orientation;
   b. a second energy absorbing coil aligned in a horizontal plane of orientation and disposed adjacent and parallel to said first energy absorbing coil and configured so as to plastically deform out of its horizontal plane of orientation and in a direction opposite to the direction of deformation of said first energy absorbing coil;
   c. said first energy absorbing coil and said second energy absorbing coil being fastened together at two points along their respective circumferences;
   d. a first fastening means attached to said first energy absorbing coil and extending transverse to the horizontal plane of the first energy absorbing coil and in the direction of the coil's deformation;

e. a second fastening means attached to said second energy absorbing coil and extending transverse to the horizontal plane of the second energy absorbing coil and in the direction of the coil's deformation;

f. said first energy absorbing coil set at a predetermined stress preload so as to prevent plastic deformation of the coil until the predetermined stress preload has been exceeded;

g. said second energy absorbing coil set at a predetermined stress preload so as to prevent plastic deformation of the coil until the predetermined stress preload has been exceeded;

h. said first energy absorbing coil attached to said tower arm by said first fastening means; and i. said second energy absorbing coil attached to said insulator string by said second fastening means;

j. whereby when a given load which exceeds the predetermined stress preload set into the first energy absorbing coil and set into the second energy absorbing coil is imparted to said transmission tower, said first and second energy absorbing coils plastically deform in opposite directions out of their plane of orientation to absorb the load imparted to the transmission tower.

2. An apparatus in accordance with claim 1 wherein:

a. said first energy absorbing coil is a flat double coil which is configured in two circular horizontal paths in the same plane which begin at a common center and travel toward the outer circumference in two parallel paths, with each path containing a transverse opening adjacent its outermost portion such that the two openings lie approximately opposite each other;

b. said second energy absorbing coil is a flat double coil which is configured in two circular horizontal paths in the same plane which begin at a common center and travel toward the outer circumference in two parallel paths, with each path containing a transverse opening adjacent its outermost portion such that the two openings lie approximately opposite each other;

c. a respective one of the transverse openings in the first energy absorbing coil aligned with a respective one of the transverse openings in the second energy absorbing coil; and d. said first energy absorbing coil and said second energy absorbing coil are fastened together at the location of a respective pair of aligned transverse openings such that the two coils lie superposed on one another and the two locations at which the two coils are fastened together lie on a diameter of the two superposed coils.

3. An apparatus in accordance with claim 2 wherein said first energy absorbing coil and said second energy absorbing coil are disposed so that when viewed in their superposed relationship they appear to be wound in opposite directions.

4. An apparatus in accordance with claim 2 wherein said first energy absorbing coil and said second energy absorbing coil are fastened together by a pair of bolts and nuts with one bolt extending through one pair of aligned transverse openings in the coils and the other bolt extending through the second pair of aligned transverse openings in the coils.

5. An apparatus in accordance with claim 1 wherein said first fastening means is a clevis.

6. An apparatus in accordance with claim 1 wherein said second fastening means includes a socket for mounting with a ball for mating with a standard insulator socket.

7. A compact apparatus for long stroke energy absorption, which apparatus is attached to the tower arm of a transmission tower and to the insulator string of a transmission tower, the apparatus comprising:

a. a first energy absorbing coil aligned in a horizontal plane of orientation and configured so as to plastically deform out of its horizontal plane of orientation;

b. said first energy absorbing coil is a flat double coil which is configured in two circular horizontal paths in the same plane which begin at a common center and travel toward the outer circumference in two parallel paths, with each path containing a transverse opening adjacent its outermost portion such that the two openings lie approximately opposite each other;

c. a second energy absorbing coil aligned in a horizontal plane of orientation and disposed adjacent and parallel to said first energy absorbing coil and configured so as to plastically deform out of its horizontal plane of orientation and in a direction opposite to the direction of deformation of said first energy absorbing coil;

d. said second energy absorbing coil is a flat double coil which is configured in two circular horizontal paths in the same plane which begin at a common center and travel toward the outer circumference in two parallel paths, with each path containing a transverse opening adjacent its outermost portion such that the two openings lie approximately opposite each other;

e. a respective one of the transverse openings in the first energy absorbing coil aligned with a respective one of the transverse openings in the second energy absorbing coil;

f. said first energy absorbing coil and said second energy absorbing coil are fastened together at the location of a respective pair of aligned transverse openings such that the two coils lie superposed on one another and the two locations at which the two coils are fastened together lie on a diameter of the two superposed coils;

g. a first fastening means attached to the center of said first energy absorbing coil and extending transverse to the horizontal plane of the first energy absorbing coil and in the direction of the coil's deformation;

h. a second fastening means attached to the center of said second energy absorbing coil and extending transverse to the horizontal plane of the second energy absorbing coil and in the direction of the coil's deformation;

i. said first energy absorbing coil set at a predetermined stress preload so as to prevent plastic deformation of the coil until the predetermined stress preload has been exceeded;

j. said second energy absorbing coil set at a predetermined stress preload so as to prevent plastic deformation of the coil until the predetermined stress preload has been exceeded;

k. said first energy absorbing coil attached to said tower arm by said first fastening means; and l. said second energy absorbing coil attached to said insulator string by said second fastening means;

m. whereby when a given load which exceeds the predetermined stress preload set into the first energy absorbing coil and set into the second energy absorbing coil is imparted to said transmission tower, said first and second energy absorbing coils plastically deform in opposite directions out of their plane of orientation to absorb the load imparted to the transmission tower.

* * * * *